United States Patent [19]
Pedersen

[11] 4,022,596
[45] May 10, 1977

[54] POROUS PACKING AND SEPARATOR MEDIUM

[76] Inventor: George C. Pedersen, P.O. Box 570085, Perrine, Fla. 33157

[22] Filed: Aug. 27, 1975

[21] Appl. No.: 608,099

[52] U.S. Cl. .................................. 55/528; 210/499; 261/94; 428/116; 139/408
[51] Int. Cl.² ........................................ B01D 39/04
[58] Field of Search .................. 261/94; 55/528; 210/499; 428/116; 139/408

[56] References Cited

UNITED STATES PATENTS

| | | | |
|---|---|---|---|
| 2,290,162 | 7/1942 | Bragg | 261/94 |
| 2,615,699 | 10/1952 | Dixon | 261/94 |
| 2,804,937 | 9/1957 | Poole | 55/522 |
| 2,921,776 | 1/1960 | Keepins | 261/DIG. 72 |
| 3,243,170 | 3/1966 | Ellis et a. | 261/94 |
| 3,713,875 | 1/1973 | Beyer et al. | 210/499 |

FOREIGN PATENTS OR APPLICATIONS

| | | | |
|---|---|---|---|
| 709,075 | 5/1954 | United Kingdom | 55/522 |

*Primary Examiner*—Bernard Nozick
*Attorney, Agent, or Firm*—Mandeville and Schweitzer

[57] ABSTRACT

A material is provided for use as a tower packing and/or as the separation medium in mist eliminators. Also provided are methods for producing the new material. The new material is comprised of woven strands, or at least two sets of strands interleaved together in directions perpendicular to each other, with the strands in either the warp or filling direction being essentially straight, while those in the other direction are geometrically reoriented or otherwise configured through the straight strands in a specific manner and, preferably, joined together at intersecting points, to produce a material having substantial thickness in cross section. All of the individual strands of the material, when placed for use, will be essentially perpendicular to the fluid flow being treated. As a result, the material of the invention provides a substantial increase in the void fraction for mist elimination and a substantial increase in impact contact surfaces for tower packing applications.

17 Claims, 8 Drawing Figures

POROUS PACKING AND SEPARATOR MEDIUM

STATEMENT OF THE INVENTION

Generally speaking, this invention relates to a fluid treating medium for positioning in a confined area through which the fluid passes for removing particulate material from the fluid, or otherwise imparting special characteristics to the fluid by specialized and repetitious contact with the treating medium. More particularly, this invention relates to material useful as a tower packing medium for enhancing the impact contact surfaces of the flow of fluids through the tower or as a separation medium in mist eliminators for increasing the void volume in the mist eliminator for bringing about enhanced efficiency in the removal of moisture droplets and/or other particles of material in a fluid flow. The material of the invention is comprised of at least two sets or systems of strands interleaved together in a perpendicular configuration to each other and simultaneously or subsequently treated, so that one system of strands extending in one direction of the material are generally straight, while the strands of the second system are geometrically arranged in their interleaved position with the first set of strands in a specific manner to provide the material with a specific cross section. As such, the material presents a surface to the fluid passing therethrough of enhanced or increased void volume, as compared to previous materials.

Background of the Invention

As will be appreciated by practitioners in the art of mist eliminators and fluid flow treatment towers, the two desired optimum characteristics for the treating medium in those devices are essentially opposite to each other. That is, it is essential for efficient treatment that the fluid passing through the treating medium does so without any undue blockage thereof. Otherwise, in counterflow treating towers, for example, the power needed to move the fluid increases substantially and in direct relation to the blockage caused by the treating medium. With mist eliminators, the treating medium becomes flooded with the material being removed from the fluid passing therethrough. Nevertheless, the treating medium must provide the appropriate impact contact with the fluid being treated or the treatment is less than effective, and the desired results are not achieved. In attempting to derive a balance between these two essentially opposed desired characteristics, many forms of treating medium have been developed. One such form is a knitted wire mesh type material, and recent developments have included treating materials comprised of synthetic polymer filaments. However, in all of these applications, the configuration of the individual strands is such that a substantial portion of the individual lengths making up the material are not positioned perpendicular to the flow of the fluid being treated. As such, the fluid being treated flows substantially parallel to those portions not perpendicular to the fluid flow and as a result, those portions of the treating material are not effective for providing the proper impact. Those portions are, therefore, essentially non-active or non-useful in the treating material medium, and because of this, a larger bulk density of the actual material involved in any given dimension of treating material thickness must be utilized, or conversely, the ultimate treatment effectiveness is substantially reduced.

Description of the Invention

By contrast, and quite unexpectedly, it has now been found, in accordance with this invention, that by interleaving two sets of strands to run in directions perpendicular to each other, and positioning the strands in a particular way, including having one set of strands substantially straight while the opposite set which runs perpendicular to the straight strands are bent or deformed in a manner to give the total material comprising the two sets of strands an increased thickness dimension in cross section, with simultaneous joining of the two sets of strands at the intersections thereof, a substantial increase in impact effectiveness is achieved with fluids for treatment passing therethrough. Moreover, there is a substantial increase in the void volume of the treating material. That is, the strands occupy a substantial decrease in the space occupied by the whole material within a given volume of the material, thus increasing the void fraction, as noted above. This is because, as also noted above, substantially all of the longitudinal extent of the individual strands are in planes perpendicular to the flow of the fluid being treated. The void volume or fraction should be at least 70% to be operative and, preferably, about 90%.

While the strands forming the material of the invention herein may be comprised of a plurality of materials, including metal, preferably the strands are comprised of yarns of thermoplastic polymers having some degree of the property of heat shrinkability. As will be appreciated by practitioners in the art, however, the yarns may be comprised of natural materials which are, preferably, coated with a heat shrinkable thermoplastic for subsequent formation of the yarns into the desired final configuration of treating material. Moreover, the yarns may be comprised, either partially or wholly, of pre-polymers which may be geometrically reoriented or otherwise configured into the material of the invention by subsequent cross-linking, either through the application of heat or exposure to other substances causing the cross-linking. While the strands are, preferably, monofilaments of thermoplastic polymers, it is within the purview of this invention that they may be multifilament or spun strands.

Preferably, the fluid treating material of the invention is woven into a fabric web of substantial length, which can be handled in conventional textile handling equipment, for subsequent treating, to bring about the proper configuration of treating material, in accordance with the invention. Illustrative of a woven pattern which has proved satisfactory in achieving the desired results, in accordance herewith, as the pattern for a "greige" material web for subsequent treatment is the "waffle weave" or "honeycomb" type of woven pattern.

Before describing this invention in more detail, it may be well to note that satisfactory results have been achieved, in accordance herewith, utilizing as the strands of the treating material of the invention, thermoplastic monofilament yarns comprised of such representative materials as polyvinylidene fluoride, polypropylene, polyethylene, polyphenylene oxide, polyesters and polytetrafluoroethylene. Thus, a honeycomb weave web produced of polypropylene yarn may be subsequently continuously exposed to specified temperature ranges for specified periods of time and under particular conditions to be noted below, and by utilizing the heat shrinkable characteristics of the yarn, either the warp or the filling yarns of the web may be allowed to heat shrink into a specific new orientation in relation to the other set of yarns to increase the thickness of the honeycomb configuration of the web, thus causing the material of the web to take up more space or more volume in relation to the actual volume occupied by the warp and filling yarns themselves, or the web itself prior to treatment.

As purely illustrative of a procedure which may be carried out, a continuous length of web of polypropylene yarns woven into a honeycomb pattern is placed on a conventional tenter frame, with the filling yarns held by the pins of the tenter frame under a degree of tension. This degree of tension is only to the degree necessary to accommodate the shrinkage of the filling yarns while maintaining them substantially straight. With respect to the warp yarns in such a procedure, no direct tension is applied to them, other than that related to the length of the web passing through a treatment line. Thus, a continuous length of such a web is passed through a heating zone and exposed to temperatures of about 295° F. The rolls supporting the web before and after the heat zone are controlled, so that there is a slight overfeeding of the web through the heat zone. This accommodates the lengthwise crinkling or crimping of the warp fibers in their geometric reorientation, to the degree necessary to bring about the formation of the desired thickness of the initial honeycomb pattern of the web into the final, more precisely delineated pattern from the initial honeycomb or waffle weave pattern. The ratio of actual tension applied to the warp yarns as applied to the filling yarns has a direct relationship to the void volume of the final material, and reducing the ratio reduces the void volume.

The effect of the special treatment (in this case an application of heat) is to give the final web a high degree of resiliency under load. Nevertheless, and in combination with this resiliency, the material has a much higher degree of rigidity, making it self-supporting. This is most appropriate, for example, when the material of the invention is to be used for tower packing. For example, larger diameter yarns may be used to support the actual tower packing material, or as a substitute for such supports, including conventional tower support plates. The materials comprised of larger diameter strands or filaments may be used alternately in the tower packing with smaller diameter filaments, so as to treat simultaneously the fluids passing therethrough, while being self-supporting. It will be appreciated that this arrangement allows for simultaneous increased treatment while decreasing the deleterious effect of conventional tower support plates which reduce the cross sectional area in the tower useful for actual treating of fluids passing therethrough.

The same use of treating materials of yarns of varying diameters may be used in the treating zone of mist eliminators. That is, in mist eliminators, very fine filaments are more efficient for smaller particles or droplets than are larger filaments or yarns comprising the treating material. However, the ability of the eliminator to handle a particular load of spray also decreases with the decreasing diameter of the impact surfaces of the treating material. Therefore, when the strand or yarn diameter of the treating material is too fine, the theoretical efficiency may be very high in normal operations, but the column will flood and will not function properly.

With this invention, by contrast, such a situation can be overcome by grading the diameter of yarns in the materials in the mist eliminator zone. That is, thicknesses of treating materials comprised of relatively coarse strands or yarns may be used at the bottom or initial treating area of the mist eliminator zone, while finer filaments or yarns can be used in the upper areas thereof. For example, in a mist eliminator zone of four inches thick, the bottom one inch might have a treating material comprised of yarns of 0.031 inches, the next higher inch of the zone may have a treating material comprised of yarns of a diameter of 0.008 inches, the next inch with yarns of 0.002 inches and the top section with yarns of 0.001 inch in diameter. With such an arrangement, each of the individual sections is handling and removing primarily that load in size for which it is efficient.

When using the preferred thermoplastic yarns, it will be appreciated that the cost advantages of the invention, in accordance herewith, are substantial, not only in the initial formation of the treating material, but also with respect to the relative ease of installation of such materials, particularly when they are utilized in a self-supporting manner. Moreover, because of the built-in heat connection between the individual crossed strands of the material and their substantial flexible rigidity, there is good integrity for the material over a long period of use. Also, while the treating material of the invention will be generally comprised of only two sets of yarns, arranged in perpendicular fashion to each other, it is within the purview of the invention to incorporate a third system for specific applications, such as, for example, in mist elimination where a specific treating capacity is required for a certain section of the mist elimination zone.

In considering, generally, the conditions for achieving the most enhanced results, in connection herewith, which conditions are more specifically set forth below, one may note that satisfactory fluid treatment materials are achieved with strands of a diameter within the range of between about 0.001 and 0.50 inches. For tower packing, this range will be within the range of between about 0.015 and 0.50 inches and for mist elimination, generally the diameters will be less and within the range of between about 0.001 and 0.040 inches. When a honeycomb weave is used, the length of the repeat pattern will be about 16–70 yarns per repeat, rather than the more conventional 12 yarns or less. While, generally, the diameters of the "warp" and "filling" yarns of the weave will be the same, it will be understood that it is within the purview of this invention that these diameters may vary in relation to each other for specific applications, and the specific requirements in certain installations. As noted above, thermoplastic yarns are preferred because of the ease in handling, in order to alter the geometry and orientation of the yarns to improve their approach to optimum potential in their treating capacity. Preferably, these yarns will be monofilaments. However, multifilaments can be used, as noted above, for one set of strands in the treating material and, preferably, in the warp direction, in order to add bulk density, particularly in some mist eliminator applications.

As noted above, the effect of the particular geometric orientation of the individual strands of the treating material, in accordance herewith, has the effect of positioning the entire length of each individual strand substantially perpendicular to treating fluid passing therethrough. This also increases the thickness of the initial greige material and increasing the thickness has the effect of increasing the void fraction, or a decrease in the space within a given volume of the material taken up by the individual strands themselves. While it is not completely understood as to why this particular arrangement and positioning increases the effectiveness of the treating medium, in accordance herewith, it is believed that as the fluid flows over each individual yarn or strand, it forms rotating eddies behind or in the direction away from the movement of the fluid being treated in relation to the strands. These eddies, therefore, move in the direction of the bulk flow of the fluid being treated and are, in turn, encountered by subsequent perpendicularly positioned strands. Because of this, and because of the substantial increase in the number and length of the individual strands which provide this effect, the fluid being treated is constantly subjected to this kind of rotating contact, which has the effect of increased exposure of the treating fluid, whether in a countercurrent liquid-gas contact in a treatment tower, for example, or for removal of particulate or moisture in a mist eliminator application.

Other objects and advantages of this invention will be apparent from the following description, the accompanying illustrative drawings, and the appended claims.

DESCRIPTION OF THE DRAWINGS

FIG. 2a is a cross section taken along lines 2a—2a of FIG. 1a;

Figure 1A:
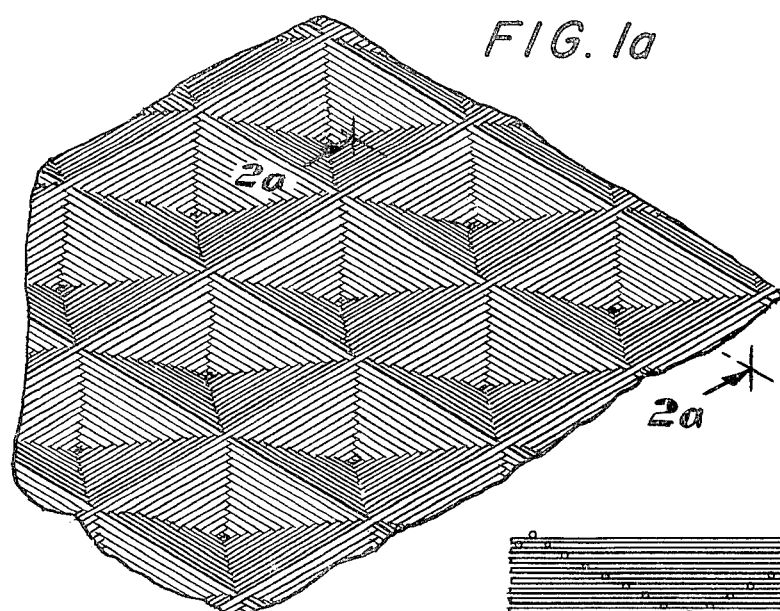
FIG. 1a is a perspective view of a section of the material of the invention in greige form prior to final treatment, in accordance with this invention, with the material being a honeycomb weave.
Figure 2A:
Figure 1B:
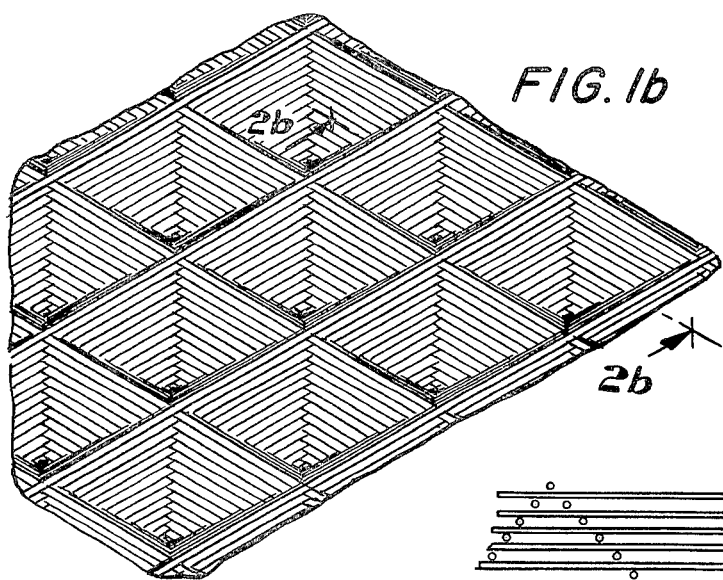
FIG. 1b is a perspective view of the material of FIG. 1a after final treatment, in accordance herewith.
Figure 2B:
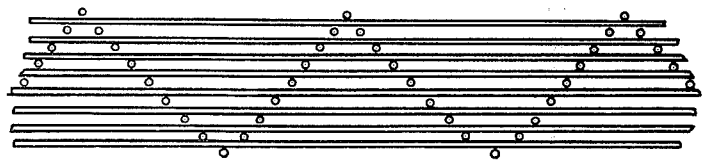
FIG. 2b is a cross section taken along lines 2b—2b of FIG. 1b.

Referring to the drawings, and particularly to FIGS. 1a and 1b, it will be noted that in FIG. 1b, the thickness of the treating material is substantially increased over the material in greige condition in FIG. 1a. Moreover, the individual pockets of the honeycomb pattern are much deeper and more pronounced in their configuration of the pattern than the material in FIG. 1a. Moreover, as can be seen in FIGS. 2a and 2b, a substantial increase in the actual volume of space taken up by the very same material is obvious from the showing of the treated material of FIG. 2b, as compared to the material of FIG. 2a.

Figure 3A:
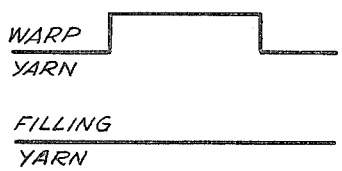
FIG. 3a shows the configuration of individual warp and filling yarns in those applications where the filling yarn is held substantially straight and under higher tension than the warp yarns.
Figure 3B:
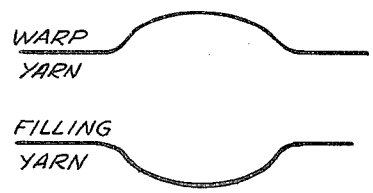
FIG. 3b is a showing of the individual warp and filling yarns when excessive tension is applied to the warp yarn during a heat treatment application, in accordance herewith.
Figure 3C:
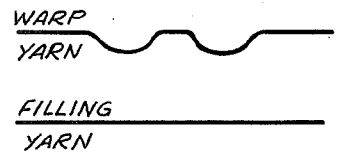
FIG. 3c shows an individual warp and filling yarn when excessive tension is applied to the filling yarns during a heat treatment application, in accordance herewith.

Referring now to FIGS. 3a, 3b and 3c, these figures show the comparative configuration of the individual warp and filling yarns in those applications where the filling yarns are held under substantially increased tension as compared to the warp yarns. That is, in those applications where the web of thermoplastic monofilament strands are treated on a conventional tenter frame with the filling yarns being held on the tenter pins under tension, and the warp yarns are held under substantially less tension, with that less tension being mainly through the tension derived from the length of the web itself, extending between the controlled speeds of the rolls prior to heat treatment and after heat treatment. The controlled speed accommodates a certain amount of overfeed for the warp yarns, with that overfeed being such as to take up or "absorb" residual shrinkage in the yarns, other than necessary to accommodate the actual and desired formation of the warp geometric configuration, as shown in FIG. 3a. If, for example, there is excessive warp tension, the yarns of the final product will take on the configuration of FIG. 3b, while if there is excessive filling tension, or the filling yarns are held by the tenter pins under more tension than necessary to hold those yarns straight while accommodating their residual shrinkage, the yarns take on the configuration of FIG. 3c.

Figure 4:
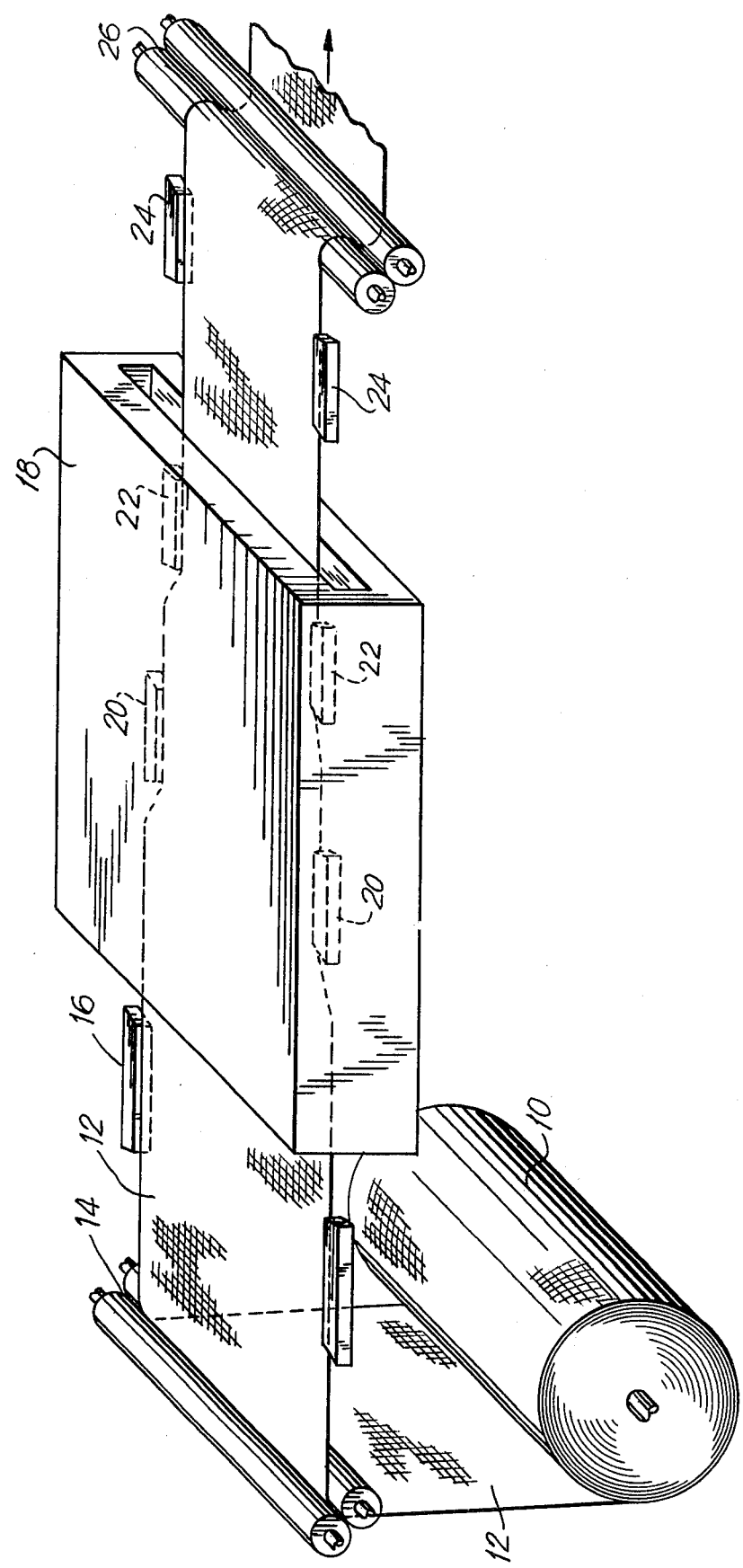
FIG. 4 is a purely schematic illustration of apparatus which may be used in the heat treatment of the materials in accordance with this invention, in which the warp yarns are held under higher tension than the filling yarns.

As purely illustrative of apparatus which may be used for heat treating an elongated thermoplastic web, one may note the arrangement shown in FIG. 4, wherein a roll 10 of a web comprised of thermoplastic yarns woven into a particular pattern is shown as a supply roll. The web 12 leading from supply roll 10 is passed over entrance rolls 14, past a pair of temple spacers 16 and then into oven 18. From oven 18, the web 12 passes over a pair of exit rollers 26, from which the web passes for cooling and gathering for subsequent use, as will be appreciated. This arrangement, as shown in FIG. 4, is representative of apparatus useful for producing a treating material, in accordance with this invention, in which the warp yarns are held under higher tension than the filling yarns and in a substantially straight condition during the treatment. In order to achieve this, a control is arranged for the speed of entrance roll 14 in relation to exit rolls 26, so as to maintain the warp yarns under that amount of tension necessary to hold them straight, while still accommodating the residual shrinkage properties in the warp yarns. The filling yarns, on the other hand, are allowed to shrink in a controlled manner between the various pairs of temple spacers 16, 20, 22 and 24, which accommodate the gradual decrease in the width of web 12 as the filling yarns are shrunk by the heat treatment in oven 18 into the desired geometric orientation of the treating material, in accordance herewith.

As purely illustrative of a procedure which may be carried out for producing a fluid treatment material, in accordance herewith, one may note the following example, in which a greige woven, honeycomb material comprised of polypropylene yarns was used.

EXAMPLE

The greige material used was comprised of warp and filling yarns, both of a diameter of 16 mils, and was comprised of low shrinkage polypropylene monofilament yarns. The honeycomb pattern of the greige material had a 36 repeat in the pattern, with an end count of 32 and a pick count of 26. In this example, three heat treatment passes were used because of the limitations of the spacing involved with the equipment being utilized.

Furthermore, in this example, the filling yarns were held under tension on a tenter frame and allowed to shrink only the amount necessary to hold the filling yarns under tension while accommodating the shrinkage therein. In the first pass, the width of the web and, therefore, the filling yarn length, was allowed to decrease 1%, with an overfeed of the warp yarns of approximately 7%, while the web was exposed to a temperature of 220° F. for a 10 minute period. In the second pass, the width of the web (the filling yarn length) was allowed to decrease an additional 1%, with an overfeed of the warp yarns of approximately 7%, at a temperature of 250° F., with a 10 minute exposure time. In the third pass, the width was held constant with an overfeed of about 7% for the warp yarns and the temperature was 295° F., with an exposure time of ten minutes. After this treatment, the web increase in thickness, as viewed in cross section, was from 0.20 inches initially to 0.36 inches after the third pass. The pick count had increased to 31 picks per inch, with the final residual shrinkage of the finally treated fabric, as measured in boiling water, reduced from approximately 5% to less than 1%. It should be noted that in this example, after each heat setting pass, the material was cooled down and removed from the tenter pins prior to the additional heat setting passes.

The "before" and "after" results achieved on the material of the example, noted above, is shown in Table I below.

TABLE I

| | Before | After |
|---|---|---|
| Weight Oz./Sq. Ft. | 1.03 | 1.12 |
| Thickness - Inches | 0.20 | 0.36 |
| Yarn Fraction | 0.065 | 0.039 |
| Void Fraction | 0.935 | 0.961 |
| Fraction of 4 Micron Particles Passing One Layer | 0.72 – 0.73 | 0.59 – 0.60 |
| Fraction of 6 Microns Particles Passing One Layer | 0.64 – 0.68 | 0.62 – 0.64 |
| Equation for Pressure Drop/Inch of Thickness, in inches of H20/in. | $\Delta P = 6.76 \times 10^{-3} \times V^2$ | $\Delta P = 4.27 \times 10^{-3} \times V^2$ |
| F. Feet$^{-1}$ | 3470 | 3270 |

As can be seen from Table I, there has been a substantial increase in the void fraction, or stated otherwise, a marked decrease in the space taken up by the individual yarn within a given volume occupied by the material. As applied to tower packing applications, this increase in the void fraction and improved orientation of the yarns of the treating material markedly reduces the pressure drop through the material or the loading, as applied to mist eliminators. As can be seen from Table I, the F factor for measuring loading for mist eliminator applications and the void fraction which is important with respect to tower packing applications, are both substantially improved by the utilization of the treating material of the invention.

Thus, as will be apparent from the foregoing, there are provided, in accordance with this invention, materials useful for producing enhanced results as treating medium in the form of tower packing and in mist eliminators. The material, as noted above, not only provides increased void volume through the strategic placement of the lengths of the individual strands of material making up the treating medium, but also, because of the interconnection between the strands in relation to their placement, the materials of the invention are self-supporting. That is, the materials herein provide a high degree of resiliency under load, while still being relatively incompressible, as compared to similar materials of similar bulk density. Moreover, the actual substantial decrease in bulk density for a given volume occupied by the material of the invention increases the "flow characteristics" and reduces load on the power required for driving fluids being treated therethrough. Nevertheless, because of the precise placement of the lengths of the individual strands of the material herein, to be substantially perpendicular to fluid flow, more actual surface contact for a given solid bulk is achieved.

In addition, because the material is self-supporting and because large variations may be made in the diameters of the individual strands or filaments of the material of the invention, many variations in treatment effect may be developed to accommodate or tailor treatment to the demands of a particular installation.

While the methods and materials herein disclosed form preferred embodiments of this invention, this invention is not limited to those specific methods and materials, and changes can be made therein without departing from the scope of this invention, which is defined in the appended claims. For example, it will be appreciated that the individual strands of the material can be hollow for carrying heat exchange medium. For applications in liquid cooling towers, a three-phase cooling effect can be achieved.

I claim:
1. A porous contacting medium characterized by
   a. a first set of strands of material;
   b. each strand of said first set being substantially straight and parallel to every other strand in the set;
   c. each strand of said first set being spaced from every other strand in the set both vertically and horizontally;
   d. a second set of strands of material interleaved with said first set;
   e. each of the strands of said second set being substantially parallel to every other strand in the set;
   f. said strands of said first set being perpendicular to the strands of said second set;
   g. the lengths of each strand of said second set extending in interleaved fashion through the strands of said first set in a geometric orientation to fit the vertical and horizontal offset spacing of each strand in said first set;
   h. each of said strands of said second set including a plurality of substantially straight line portions with said portions connected at angles to provide said geometric orientation; and
   i. said angled geometric orientation of said second set and said offset spacing of said first set giving said medium a thickness in cross section greater than the thickness thereof prior to said geometric orientation.

2. The treating medium of claim 1, further characterized by
   a. the diameter of each strand in each set being within the range of between about 0.001 and 0.50 inches.

3. The treating medium of claim 2, further characterized in that
 a. a third set of strands is interleaved with said first and second sets, the strands of said third set being parallel with each other and with the strands of one of said first and second sets.

4. The treating medium of claim 1, further characterized in that
 a. said treating medium is a tower packing with each strand in each set having a diameter within the range of between about 0.015 and 0.50 inches.

5. The treating medium of claim 1, further characterized in that
 a. said treating medium is a mist eliminator treating medium with each strand in each set having a diameter within the range of between about 0.001 and 0.040 inches.

6. The treating medium of claim 1, further characterized in that
 a. each strand of each set is comprised of a material selected from the group consisting of metal, heat-shrinkable thermoplastic polymers, and heat-shrinkable thermoplastic coated natural or synthetic fiber.

7. The treating medium of claim 6, further characterized in that
 a. each strand of each set is comprised of a member selected from the group consisting of polypropylene, polyphenylene oxide, polyethylene, polyvinylidene fluoride and polyvinylidene chloride.

8. The treating medium of claim 1, further characterized in that
 a. each strand of each set is comprised of a heat-shrinkable thermoplastic polymer.

9. The treating medium of claim 8, further characterized in that
 a. each strand of each set is a monofilament yarn.

10. The treating medium of claim 8, further characterized in that
 a. the geometric reorientation of said second set of strands is caused by the controlled application of heat to said treating medium.

11. The treating medium of claim 1, further characterized in that
 a. at least the strands of one of said first and second sets is comprised of multifilament yarns.

12. The treating medium of claim 1, further characterized in that
 a. said treating medium is woven into a pattern.

13. The treating medium of claim 12, further characterized in that
 a. said woven pattern is a honeycomb pattern having a repeat of between about 16 and 70 strands.

14. The treating medium of claim 13, further characterized by
 a. said strands in said first and second set being comprised of polypropylene monofilaments;
 b. said monofilaments having a diameter within the range of between about 0.001 and 0.50 inches.

15. A porous contacting medium characterized by
 a. a first set of monofilament yarns;
 b. each yarn of said first set being substantially straight and parallel to every other strand in the set;
 c. each yarn of said first set being spaced from every other yarn in the set both vertically and horizontally;
 d. a second set of monofilament yarns woven with said first set;
 e. each of the yarns of said second set being substantially parallel to every other yarn in the second set;
 f. said yarns in said first set being perpendicular to the yarns in said second set;
 g. said first and second sets of yarns being woven into a honeycomb pattern and comprised of a heat-shrinkable thermoplastic polymer;
 h. the lengths of each yarn of said second set extending in interleaved fashion through the yarns of said first set in a geometric orientation to accommodate the vertical and horizontal offset spacing of each yarn in said first set;
 i. each of said yarns of said second set including a plurality of straight line portions with said portions joined at angles to provide said geometric orientation; and
 j. said angled geometric orientation of said second set and said offset spacing of said first set giving said medium a thickness in cross section greater than the thickness thereof prior to said geometric orientation.

16. The mediun of claim 15, further characterized in that
 a. said treating medium is a tower packing material with each yarn in each set having a diameter within the range of between about 0.015 and 0.50 inches.

17. The medium of claim 15, further characterized in that
 a. said treating medium is a mist eliminator material with each yarn in each set having a diameter within the range of between about 0.001 and 0.040 inches.

* * * * *